United States Patent Office 3,679,660
Patented July 25, 1972

3,679,660
GLUCOSAMINE-ALKYLSULFONATE AND PROCESS
Agatha C. Magnus, 430 LaLoma Road, Pasadena, Calif. 91105
No Drawing. Filed June 9, 1969, Ser. No. 831,734
Int. Cl. C07c *95/04*
U.S. Cl. 260—211 R    2 Claims

ABSTRACT OF THE DISCLOSURE

The disclosure relates to a series of food and pharmaceutical additives comprising molecules which, when in aqueous solution, form an ion with a terminal hydrophilic group and a terminal hydrophobic group. Particularly useful compounds include amine salts joined to the hydrophobic group, alkane sulfonic acids joined to the hydrophobic group and cholesterics. A new chemical, glucosamine-n-alkylsulfonate is also disclosed.

BACKGROUND OF THE INVENTION

Surface active agents are commonly used because of their ability to increase the affinity of many non-aqueous substances to water. This affinity increase is believed to be a result of a molecular orientation of the surface active agent, its anion or cation when in solution. These large molecules or their ions contain a hydrophilic end and a hydrophobic end which tend to gather at an interface between an aqueous phase and a non-aqueous phase. The affinity of the hydrophobic portion for the non-aqueous phase and the hydrophilic for the aqueous phase results in a change in affinity of the two phases.

SUMMARY OF THE INVENTION

A series of these surface active agents has been found useful as additives to beverages, foodstuffs and pharmaceuticals to improve their thirst-quenching properties and to render them more easily assimilated. Cationic type surface active agents of amine salts and anionic combinations of alkane sulfonic acids have been found particularly useful as thrist-quenching and taste-enhancing additives. Especially favored are chemical combinations in which the polar hydrophilic anion or cation is directly linked to the hydrophobic group. A combination of these two types comprising the salt of a sulfonic acid and glucosamine results in a stable form of glucosamine. Cholesterol benzoate, choline O-acetyl chloride and choline carbamate chloride are also useful to promote adsorption and thus absorption.

DESCRIPTION OF THE PREFERRED EMBODIMENTS

A glucosamine-n-alkylsulfonate has been found to be particularly useful as an additive for foods and pharmaceuticals. This chemical when in aqueous solution disassociates into an anion and cation with the following formulas:

Anion:
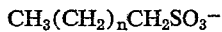
$$CH_3(CH_2)_nCH_2SO_3^-$$

Cation:
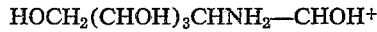
$$HOCH_2(CHOH)_3CHNH_2\text{—}CHOH^+$$

wherein $n$ is a whole number not less than 8 nor more than 30.

The chemical compounds of this invention do not exhibit any chemical action, their effectiveness being caused rather by an orientation of the ions at an aqueous interface. This orientation facilitates a surface adsorption or increased surface concentration which tends to increase absorption into the contacted membranes. When this non-aqueous membrane is a cell membrane, the assimilation of liquids through the membrane is increased, permitting a lesser amount of the liquid to be used. This effect is particularly useful in the ingestion of tonics such as quinine as described below.

The effect of these compounds on thirst-quenching enhancement is believed to result from an increased adsorption of the beverage by the tissues a few inches inside the throat. These tissues are hardly moistened by typical beverages whereas a beverage containing a compound of this invention is increasingly absorbed by these tissues resulting in a longer quenching of thrist.

The effect of the chemicals on pharmaceuticals is likewise believed to result from the orientation of the ions in solution on tissue surfaces. The better the adsorption, the better the absorption and therefore the digestion and assimilation. Also, antibiotic action is increased.

Quinine, owing to its characteristic of forming an isolating membrane, must be given in such an amount that hearts weakened by stress and exertion can no longer support the clinically active amount. However, with the additives of this invention, lesser amount of quinine may be given and the quinine is attracted to the plasmodiums stopping their propagating.

The invention may be more easily understood by reference to the following examples.

Example 1

A saturated solution of glucosamine was placed in a glass container equipped with a stirrer and placed in a cooling bath. The glucosamine solution was kept at 32° Fahrenheit because of its tendency to decompose at room temperature. A sulfonic acid of the formula

$$CH_3(CH_2)_{10}SO_3H$$

was added to the glucosamine solution until the pH reached 5. The resulting solution was dried in a vacuum yielding a low density white powder of glucosamine-n-alkylsulfonate.

Example 2

A quinine beverage was formulated using the glucosamine-n-alkylsulfonate made according to the procedure of Example 1; 13.8 grams of sugar, 0.06 grams of quinine (sulfate) and 1.3 grams of the glucosamine-n-alkylsulfonate of Example 1 were dissolved in one liter of water. Citric acid was added to give a pH of 3.5.

Example 3

The procedure of Example 2 was followed except that 0.13 grams of saccharin was used in place of the sugar to give a low-calorie beverage.

Gluscosamine-n-alkylsulfonate has the further advantage of being more stable at room temperature than pure glucosamine and yet more readily converted to pure glucosamine than is glucosamine hydrochloride.

The amine salts useful as food and pharmaceutical additives include those where the amino group is joined directly to the hydrophobic group. The amino group may be aliphatic, aromatic or part of a heterocycle. The amino group may also be linked to the hydrophobic group through an ester, amide or ether link.

The amount of sugar in the beverage of Example 2 may be varied as desired for flavor between 10 and 20 grams per liter. The amount of quinine may be between 0.03 and 0.09 grams per liter of final beverage. The amount of glucosamine-n-alkylsulfonate may be between 0.9 to 1.6 grams per liter of the final quinine water.

The invention may be embodied in a wide range of foods, beverages, candies, chewing gum, as well as pharmaceuticals. The scope of the invention is indicated by the appended claims and all changes which come in the meaning and range of equivalency of the claims are therefore intended to be embraced therein.

I claim:
1. Glucosamine-n-alkylsulfonate wherein the alkyl group contains between 10 and 32 carbon atoms.
2. A method of stabilizing glucosamine comprising: reacting an aqueous solution of glucosamine with an alkane sulfonic acid having the formula

$$CH_3(CH_2)_nCH_2SO_3H$$

wherein $n$ is a whole number from 8 to 30;
removing the water from the reacted solution to form glucosamine-n-alkylsulfonate.

References Cited

UNITED STATES PATENTS 2,097,864  11/1937  Platz et al. _____ 260—211
2,918,462  12/1959  Druey et al. _____ 260—211

OTHER REFERENCES

Noller: "Chemistry of Organic Compounds," 3rd ed. (1965), W. B. Saunders Co., Philadelphia, Pa., p. 315.

LEWIS GOTTS, Primary Examiner

J. R. BROWN, Assistant Examiner

U.S. Cl. X.R.

99—2, 28, 135, 140 R; 260—999